United States Patent [19]

Vinard

[11] E Re. 29,592

[45] Reissued Mar. 28, 1978

[54] BLOW MOLDING PROCESS FOR MANUFACTURING GRINDING WHEELS

[75] Inventor: Daniel Robert Vinard, Enghien-les-Bains, France

[73] Assignee: Norton Company, Worcester, Mass.

[21] Appl. No.: 722,289

[22] Filed: Sep. 10, 1976

Related U.S. Patent Documents

Reissue of:

[64] Patent No.: 3,963,459
Issued: Jun. 15, 1976
Appl. No.: 403,081
Filed: Oct. 3, 1973

[30] Foreign Application Priority Data

Oct. 4, 1972 France ..... 72.35126

[51] Int. Cl.[2] ..... C09K 3/14; C04B 31/16

[52] U.S. Cl. ..... 51/298 R; 51/308; 264/121

[58] Field of Search ..... 51/293, 295, 308, 309, 51/283, 298; 264/121, DIG. 10

[56] References Cited

U.S. PATENT DOCUMENTS

| | | | |
|---|---|---|---|
| 2,534,128 | 12/1950 | Howe | 51/308 |
| 2,611,938 | 9/1952 | Hansberg | 264/121 |
| 2,860,961 | 11/1958 | Gregor et al. | 51/298 |
| 2,862,806 | 12/1958 | Nestor | 51/298 |
| 2,943,926 | 7/1960 | Goepfert | 51/298 |
| 3,041,156 | 6/1962 | Rowse et al. | 51/298 |
| 3,377,411 | 4/1968 | Charvat | 51/298 |
| 3,573,013 | 3/1971 | Curn et al. | 51/309 |
| 3,615,302 | 10/1971 | Rowse | 51/309 |

OTHER PUBLICATIONS

B365,862; 5/19/1943; Delloye.

*Primary Examiner*—Donald J. Arnold
*Attorney, Agent, or Firm*—Oliver W. Hayes

[57] ABSTRACT

A composition for filling a mold with abrasive grits and bond making use of resin bond particles and abrasive grains of approximately the same size intimately mixed together for use in a blow molding procedure.

3 Claims, 3 Drawing Figures

BLOW MOLDING PROCESS FOR MANUFACTURING GRINDING WHEELS

Matter enclosed in heavy brackets [ ] appears in the original patent but forms no part of this reissue specification; matter printed in italics indicates the additions made by reissue.

BACKGROUND OF THE INVENTION

The present invention relates to the manufacturing of grinding wheels.

According to a known manufacturing method a mixture of abrasive grains, a particulate binder material and if desired some fillers are poured into an open mold, then the mold content is leveled and submitted to pressing.

The filling and leveling of the mold can be carried out outside the press, then the filled up mold may be placed in the press for compaction. This sequence of processing steps takes a relatively long time so that the manufacturing rate is relatively slow.

In following another known procedure, filling and leveling of the mold may be performed directly inside the press, but in this case it is necessary to provide enough space between the upper part of the mold and the die of the press to accommodate the leveling equipment, which consequently increases length of the die stroke and slows down operations.

It is also known to manufacture cast resin cores in molds by blowing a raw batch into the empty mold. According to this method a load including sand together with a resin binder is introduced into a hopper or a container which communicates through a passage with a cavity, whose shape corresponds to that of the core to be produced. Afterwards a relatively high pressure is suddenly applied to the container, with the result that the sand and binder mixture is blown out of the hopper and through the above-mentioned passage into said cavity.

Attempts have been made in the past to manufacture grinding wheels in this manner. However difficulties were encountered which resulted from the fact that it was impossible to obtain the necessary homogeneity and strength properties required for a grinding wheel as compared to a casting or core made of resin alone.

One particular difficulty encountered in attempts to blow mold grinding wheels resulted from the fact that the conventional mixture for manufacturing a grinding wheel consists of abrasive particles whose grain size is determined by the wheel specification and a resin binder in the form of much finer particles, so that the difference in grain sizes between both components permitted some segregation by sizes during filling of the hopper or container with this mixture and further segregation of the different grain sizes occurred when the latter is expelled by means of pressure, air or gas which segregation destroys the homogeneity of the mix rendering it useless for the manufacture of grinding wheels.

SUMMARY OF THE INVENTION

In the recent past there were discovered mixtures for grinding wheel manufacture including particles covering a substantially narrower range of grain sizes than in the past for all the raw materials in the mix. This is more particularly the case for so-called "granulated mixtures."

Research works have shown that mixtures of such type could be used in conjunction with grinding wheel manufacture by blowing, thus providing quality products with otherwise repeatable properties.

Consequently the invention relates to a grinding wheel manufacturing method comprising the following steps: making a mixture containing abrasive grains, a binder with or without fillers, introducing the mix into a mold by blowing, whereby the mix is introduced into the mold with a uniform distribution of all the particles in the mix so that a homogeneous product is obtained when said mixture is poured into the hopper and is subsequently blown into the mold, then said mixture is compressed in the mold after blowing and is cured.

Due to the nature of the mixture used and the association of blowing and pressing steps the invention provides a new and novel application of a known method that is the transfer of a mixture from a hopper into a mold by blowing, with a view to manufacturing grinding wheels.

It is therefore an object of this invention to provide an improved method for making grinding wheels.

It is another object to provide a mix of abrasive grains and resin bond particles adapted for a blow molding operation.

It is a further object to provide a speedier process for making grinding wheels.

Other objects will appear from the specification below.

IN THE DRAWINGS

DETAILED DESCRIPTION

Though applicable to all kinds of grinding wheels, the method described herein is best suited for organic bonded grinding wheels.

According to preferred embodiment the mixture used is a granulated mixture. Blowing is carried out within a closed mold, whose inner cavity volume may be reduced during pressing preferably in a two part mold having one element movable with respect to the other during pressing in order to reduce the volume of said cavity.

Grinding wheels are normally provided with a central bore for mounting about an axle. According to a feature of this invention the mixture for manufacturing the wheel may be blown into the mold through a central portion of the mold corresponding to the bore of the finished grinding wheel.

Figure 1:
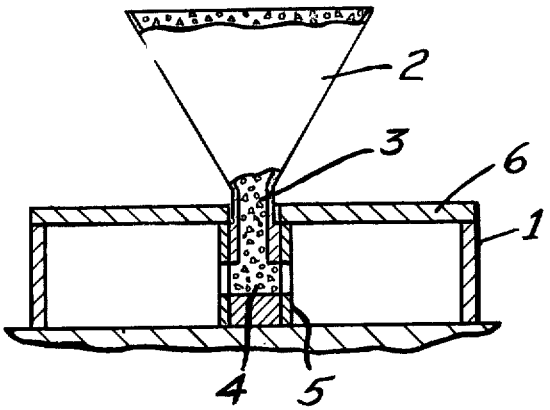
FIG. 1 shows a mold and filled hopper.
Figure 2:
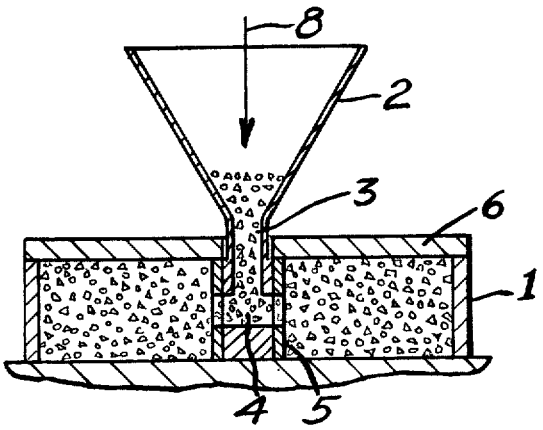
FIG. 2 shows the charge in the hopper after being blown into the mold.
Figure 3:
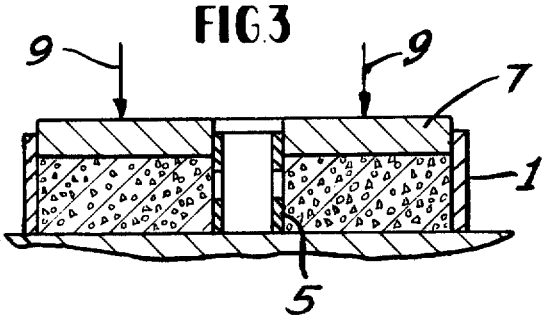
FIG. 3 shows the mix in the mold after compaction.

When manufacturing a grinding wheel in the mold shown in FIGS. 1 to 3, a granulated mixture made of abrasive grains and binder is used wherein the grain size difference between bigger and smaller granules (if considering the mean diameter of granules in a known manner) is relatively small so that the behavior of all the granules in the mix will be substantially the same when pouring the mixture into the hopper or during a pneumatic transfer thereof to the mold.

Studies performed in conjunction with the invention have shown that satisfactory results may be achieved provided that the mixture used corresponds, for instance, to one of the grain sizes that may vary in accordance with the relationship wherein D is the mean diameter of particles or granules of the mixture and 90% at least of said particles have a diameter between 0.5 and 2.D, 2% at most of said particles should have a diameter less than 0.1 D and the remainder may be larger than 0.1 D and less than 0.5 D.

According to a preferred embodiment, a mixture having a grain size distribution as mentioned below, can be used which distribution can be obtained for instance by screening 100 grams of said mixture in a known Rotap machine sold by the W. E. Tyler Company, with a typical 24 mesh screen analysis set up as specified in U.S.A. Standard Bulletin 74.12—1968, making use of the U.S. Standard sieve series. A sample of such 24 grit grains will have a distribution as follows:

Particles having a diameter over 1.5 mm — 2%

Particles having a diameter between 1.5 and 0.4 mm — 96%

Particles having a diameter less than 0.4 mm — 2%

This example naturally corresponds to a test performed with a given abrasive grain, in this instance grain of 24 grit, and it goes without saying that the particle sizes will vary according to grain size, the most important freature being the absence of a significant proportion of very fine particles, which are likely to cause a segregation and consequently reduce the efficiency of the method.

FIG. 1 represents a temporarily closed mold having a cylindrical body 1 over which is supported a hopper 2 connected through a passage 3 with cross passage 4 that passes through the center hole of the wheel that is defined by a cylindrical center wall 5 of the mold. Passage 3 opens into the inner cavity of mold 1 through said passage 4. It should also be noted that mold 1 is provided with a cover 6 during filling and includes two or more parts 1 and 7 that are movable with respect to each other after being filled so that, during compression, its inner volume can be reduced as described below.

In the state shown in FIG. 1, the mixture for manufacturing the grinding wheel is poured into hopper 2. Then a compressed air or another gas under pressure is suddenly applied to the mixture in hopper 2, as schematically represented by arrow 8 in FIG. 2, so as to pneumatically expel said mixture, through passage 3, into cross passage 4 and then into the inner cavity of mold 1 to fill said cavity.

FIG. 3 represents the last step of the manufacturing process. in this case, mold 1 was separated from the hopper a movable disc 7 is fitted into mold 1 and submitted to a pressure, as schematically shown by arrows 9, to compress the mix to the desired grinding wheel size. The reduction in volume of the inner cavity of mold is shown in FIG. 3.

It will be clearly understood that these different steps can take place in quick succession. This manufacturing process may take place if desired in a press equipped for instance with a movable table supporting the molds, which are successively pushed under a head including an annular plate 6 and transfer passages 3 and 4 connected to a hopper arranged at a sufficient height above said plate, the mixture being expelled out of the hopper into the mold through the passages to the mold cavity. In a preferred form of the invention disc 7 can be supported temporarily above the mold cavity to perform the function of the cover 6 for the mold and after filling, the hopper can be removed so pressing of disc 7 can be started while the mold remains at the filling station. In this manner a transporting movement of molds between filling step by blowing and pressing step is avoided. Under any circumstances, however high quality grinding wheels may be obtained quickly.

It is obvious that alterations may be made in the embodiment shown without departing from the spirit of the invention.

What is claimed is:

1. A method for manufacturing grinding wheels characterized in that a granulated mixture containing at least abrasive grains and bond [grains] within a hopper is introduced into a cavity of a closed mold by blowing with a compressed gas, said mixture having a relatively uniform distribution of grain sizes proportioned within a formula where D is the mean diameter of the grains in the mixture, at least 90% of the grains have a diameter between 0.5 D and 2D, 2% at most have a diameter less than 0.1 D and the remainder a diameter falling in a range between 0.1 D and 0.5 D whereby a homogeneous mass is obtained when said mixture is poured into the hopper and is blown into the cavity of the mold, then compressing and reducing the volume of said mixture in the cavity of the mold to form a grinding wheel of the desired size, and heating the grinding wheel sufficiently to cure the bond.

2. A method according to claim 1, characterized in that it is applied to the manufacture of organic resin and vitrified grinding wheels.

3. A method according to claim 2, characterized in that blowing is carried out through the bore in the center of the grinding wheel.

* * * * *